(12) United States Patent
Gomi

(10) Patent No.: US 7,466,354 B2
(45) Date of Patent: Dec. 16, 2008

(54) SOLID-STATE IMAGING APPARATUS

(75) Inventor: Yuichi Gomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 891 days.

(21) Appl. No.: 10/878,021

(22) Filed: Jun. 29, 2004

(65) Prior Publication Data
US 2005/0012837 A1 Jan. 20, 2005

(30) Foreign Application Priority Data
Jul. 16, 2003 (JP) .............................. 2003-275431

(51) Int. Cl.
H04N 5/35 (2006.01)
H04N 9/083 (2006.01)
H04N 3/14 (2006.01)
H04N 5/335 (2006.01)

(52) U.S. Cl. ...................... 348/303; 348/302; 348/281; 348/321; 348/323

(58) Field of Classification Search ................ 348/281, 348/302, 303, 260–264
See application file for complete search history.

(56) References Cited

U.S. PATENT DOCUMENTS 6,181,375 B1 * 1/2001 Mitsui et al. ........... 348/240.99

7,242,427 B2 * 7/2007 Kokubun et al. ............ 348/241

FOREIGN PATENT DOCUMENTS

| JP | 4-277985 | | 10/1992 |
| JP | 6-350933 | | 12/1994 |
| JP | 06350933 A | * | 12/1994 |

* cited by examiner

Primary Examiner—Lin Ye
Assistant Examiner—Euel K Cowan
(74) Attorney, Agent, or Firm—Westerman, Hattori, Daniels & Adrian, LLP.

(57) ABSTRACT

Disclosed herein is an XY-addressing solid-state imaging apparatus including a solid-state imaging device having a plurality of two-dimensionally arranged pixels and a horizontal and vertical scanning circuits for reading pixel signals of the solid-state imaging device; a shift register of at least one of the horizontal and vertical scanning circuits including shift register units serially connected in a large number of stages for transferring information related to scan location by clock and a storing section connected through a storing switch and transmitting switch to each shift register unit; the solid-state imaging apparatus also includes a drive control means for causing the storing section to store a scan start location information in a scan start location setting period before a main scanning so that the scan start location information is transmitted from the storing section in the main scanning to start scanning from a desired scan start location and for effecting the storing of the scan start location information also in the main scanning.

2 Claims, 9 Drawing Sheets

FIG. 9

| (1,1) | (2,1) | (3,1) | (4,1) | (5,1) | (6,1) | (7,1) |
|---|---|---|---|---|---|---|
| (1,2) | (2,2) | (3,2) | (4,2) | (5,2) | (6,2) | (7,2) |
| (1,3) | (2,3) | (3,3) | (4,3) | (5,3) | (6,3) | (7,3) |
| (1,4) | (2,4) | (3,4) | (4,4) | (5,4) | (6,4) | (7,4) |
| (1,5) | (2,5) | (3,5) | (4,5) | (5,5) | (6,5) | (7,5) |
| (1,6) | (2,6) | (3,6) | (4,6) | (5,6) | (6,6) | (7,6) |
| (1,7) | (2,7) | (3,7) | (4,7) | (5,7) | (6,7) | (7,7) |

SOLID-STATE IMAGING APPARATUS

This application claims benefit of Japanese Patent Application No.2003-275431 filed in Japan on Jul. 16, 2003, the contents of which are incorporated by this reference.

BACKGROUND OF THE INVENTION

The present invention relates to solid-state imaging apparatus in which it is feasible to read outputs of the light receiving pixels in an optionally selected region of the light receiving portion thereof.

One for example as disclosed in Japanese Patent Application Laid-Open Hei-4-277985 is known as a solid-state imaging apparatus having the capability of reading the light receiving pixels in an optionally selected region of its light receiving portion such that a shift register serving as a scanning means for time-serially reading the outputs of light receiving pixels is divided into a plurality of blocks so as to read a region of the light receiving portion corresponding to the divided blocks. With this read method, however, the unit of repetition by the shift register is a divided block so that there is a possibility of the quality of signals being changed at the boundary of one block with another. Further, since selection of the region to be read out becomes possible only with taking each block previously set at the time of manufacture of the solid-state imaging apparatus as a unit, the reading of the signals from an optionally selected region cannot be effected.

A shift register for solving such problem has been proposed by the present applicant in Japanese Patent Application Laid-Open Hei-6-350933. The construction of the shift register is shown in FIG. 1. A description will be first given with respect to the construction of such shift register. FIG. 1 includes: 1, a shift register unit having serially connected first clocked inverter 1-1 and second clocked inverter 1-2; 2, a storing switch; 3, a transmitting switch; 4, a storing section formed by serially connecting a first inverter 4-1 and second inverter 4-2.

An output node of the first clocked inverter 1-1 is connected to one end of the storing switch 2 and of the transmitting switch 3. Further, the other end of the storing switch 2 is connected to an input of the first inverter 4-1 of the storing section 4, and an output of the second inverter 4-2 of the storing section 4 is connected to the other end of the transmitting switch 3. Numeral 6 denotes a unit stage of the shift register. While a 7-stage shift register is shown in FIG. 1, many more stages are provided in a shift register to be actually used in solid-state imaging apparatus.

The first clocked inverter 1-1 becomes active when a drive clock $\Phi 2$ is at H level, and the second clocked inverter 1-2 becomes active when a drive clock $\Phi 1$ is at H level. It should be noted that $/\Phi 1$, $/\Phi 2$ indicate inverted clocks of drive clocks $\Phi 1$, $\Phi 2$. A start pulse $\Phi$ ST is inputted to an input of the first-stage shift register unit 1. Further, the storing switch 2 becomes conductive when a memory pulse $\Phi$ M is at H level, and the transmitting switch 3 becomes conductive when a transmitting pulse $\Phi$ T is at H level. It should be noted that $/\Phi$ M, $/\Phi$ T denotes inverted pulses of the memory pulse $\Phi$ M and transmitting pulse $\Phi$ T.

An operation of thus constructed shift register will now be described by way of the timing chart shown in FIG. 2. First in a prescanning (scan location setting period) before a main scanning, H level is inputted to the start pulse $\Phi$ ST at time T1, and it is shifted according to clocks $\Phi 1$, $\Phi 2$ within the shift register. To start the main scanning from the third-stage shift register unit, then, memory pulse $\Phi$ M is driven to H level at time T2, so as to store the level status at this time of node SR0.5, SR1.5, SR2.5, ... SR6.5 within each shift register unit 1 into the storing section 4. In other words, the input node of the storing section 4 of the first, second, fourth, fifth, sixth, seventh unit blocks is caused to store H level, and the input node of the storing section 4 of the third unit block is caused to store L level.

Subsequently, by driving the transmitting pulse $\Phi$ T to H level at time T3, the level stored at time T2 is transmitted to the node SR0.5, SR1.5, SR2.5, ... SR6.5 within each shift register unit 1. Since, at that point in time, clock $\Phi 1$ is at H level, inverted outputs of the nodes SR0.5, SR1.5, SR2.5, ... SR6.5 are outputted to the nodes SR1.0, SR2.0, SR3.0, ... SR7.0 within each shift register unit 1, respectively. Thereafter, since these outputs are shifted in accordance with clocks $\Phi 1$, $\Phi 2$ within the shift register, the scanning of the shift register is to be started from node SR3.0 of the third-stage shift register unit. At time T4, by bringing the transmitting pulse $\Phi$ T to H level to transmit information in the storing section 4 again, the scanning of the shift register is started from SR3.0 in a similar manner as that followed time T3. Accordingly, in the main scanning period starting from time T3, the scanning of the shift register is started from node SR3.0 based on the transmitting of the information stored at the storing section 4.

SUMMARY OF THE INVENTION

It is an object of the present invention to provide a solid-state imaging apparatus in which pixel signals from an optionally selected region can be accurately read for a long time period.

In a first aspect of the invention, there is provided an XY-addressing solid-state imaging apparatus including a solid-state imaging device having a plurality of two-dimensionally arranged pixels and horizontal and vertical scanning circuits for reading pixel signals of the solid-state imaging device, a shift register of at least one of the scanning circuits having shift register units serially connected in a large number of stages for transferring information related to read scan location by clock, a storing section disposed corresponding to each shift register unit for storing an output of shift register unit at a succeeding stage of the shift register unit, a storing switch provided between the shift register unit at the succeeding stage and an input of the storing section, and a transmitting switch provided between an output of the storing section and corresponding shift register unit, the solid-state imaging apparatus including: a drive control means for causing the storing section to store information related to a read scan start location in a scan start location setting period before a main scanning and, in the main scanning, transmitting to the shift register the information related to the read scan start location stored at the storing section previously to the main scanning by driving the transmitting switch to transfer the information related to the read scan start location and for storing again the information related to the read scan start location by driving the storing switch at a timing of the arriving of the information related to the read scan start location at the shift register unit connected through the storing switch to the storing section at which the information related to the read scan start location is stored.

In a second aspect of the invention, the drive control means in the solid-state imaging apparatus according to the first aspect, after shifting a shift pulse for inputting to the shift register the information related to the read scan start location to a shift register unit at the succeeding stage of the shift register unit at a desired read scan start location in the scan start location setting period before the main scanning, drives the storing switch to cause information of each shift register unit to be stored to the storing section connected thereto through the storing switch so as to store the information related to the read scan start location.

BRIEF DESCRIPTION OF THE DRAWINGS

FIG. 9 shows the manner of reading signals from 3×3 pixels of the 7×7 pixels in the third embodiment shown in FIG. 8.

DESCRIPTION OF THE PREFERRED EMBODIMENTS

Embodiment 1

Figure 1:
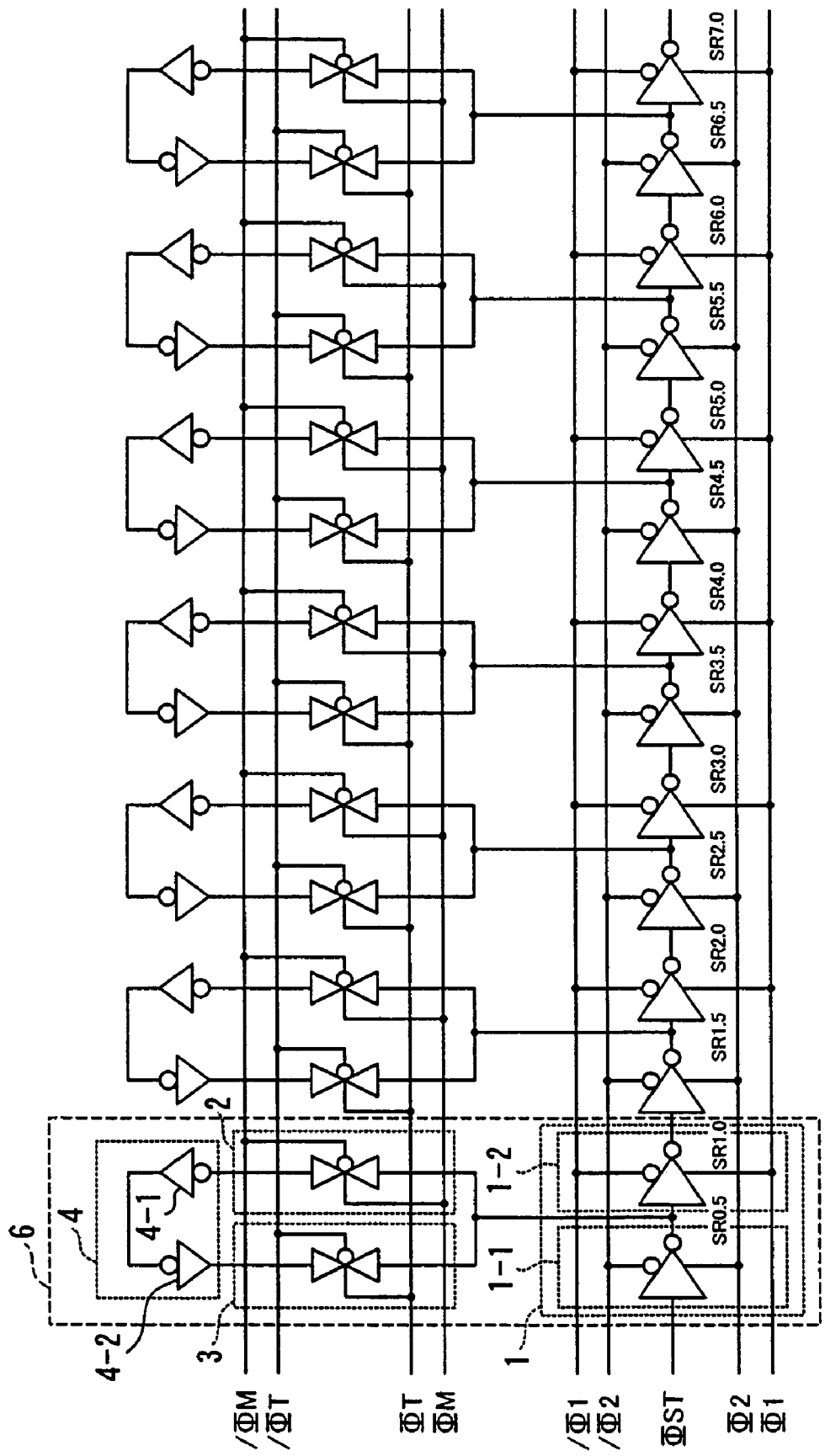
FIG. 1 is a circuit diagram showing a shift register of the scanning circuit of a prior-art solid-state imaging apparatus.
Figure 2:
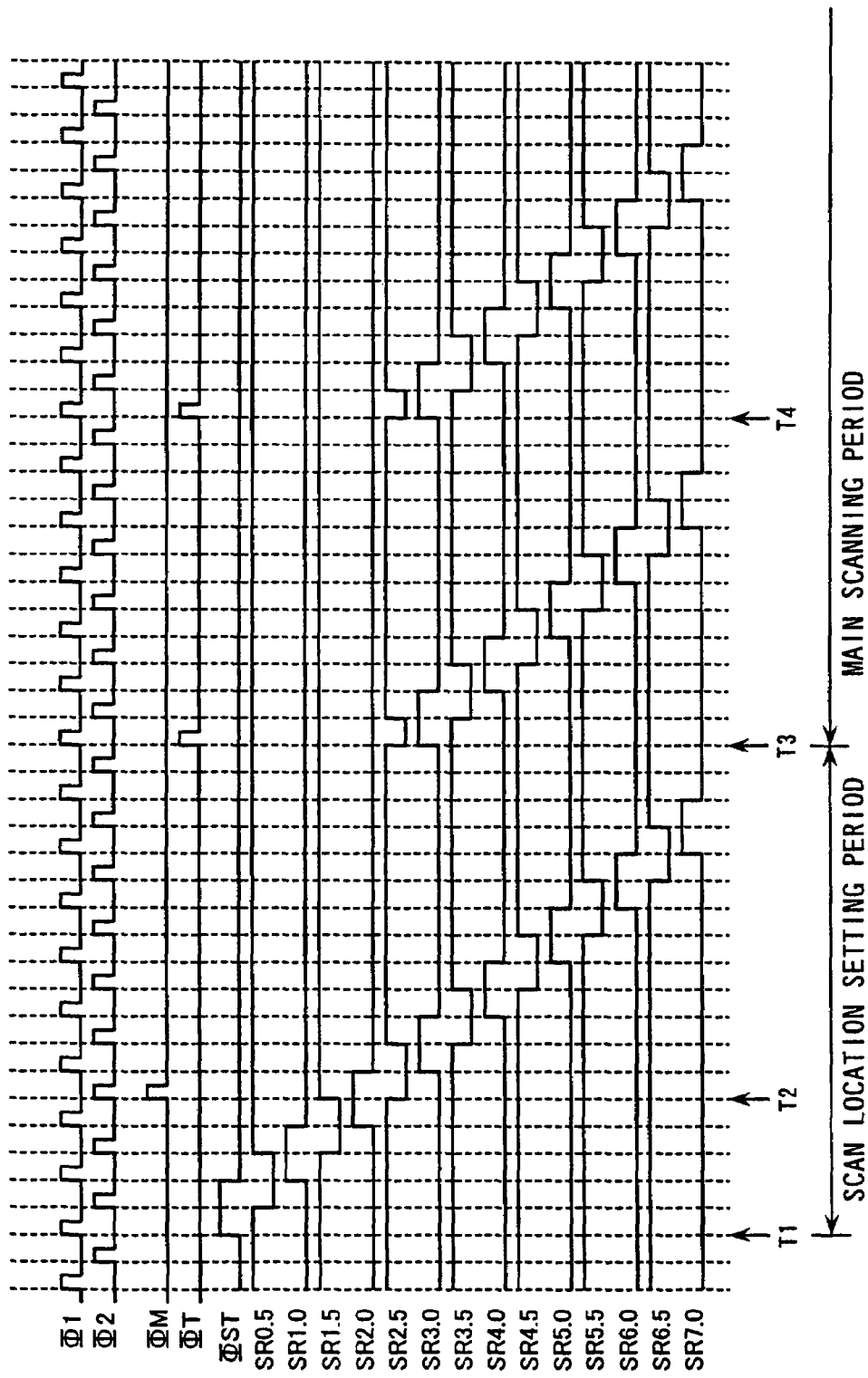
FIG. 2 is a timing chart for explaining operation of the shift register shown in FIG. 1.
Figure 3:
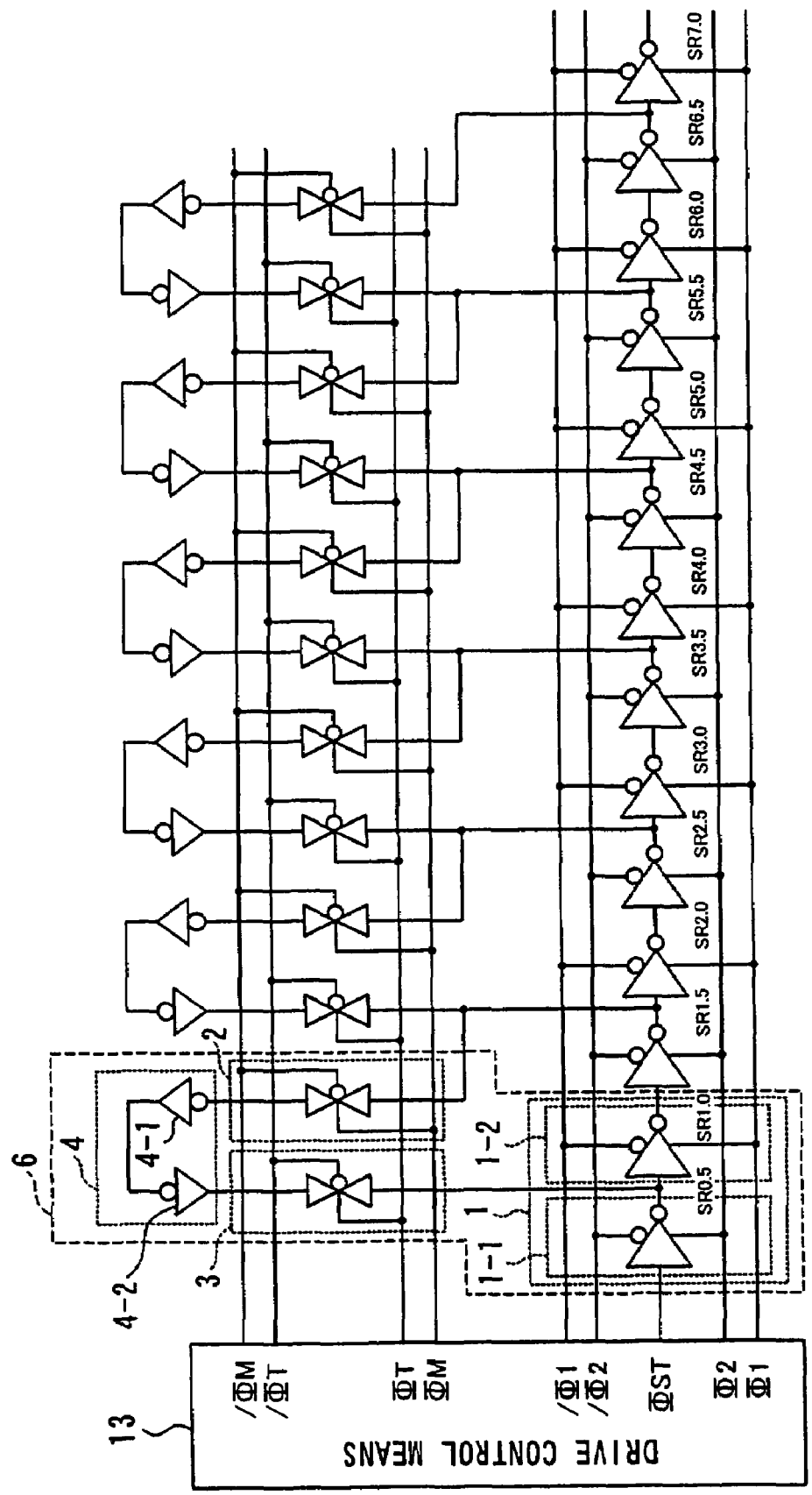
FIG. 3 is a circuit diagram showing a shift register of the scanning circuit in a first embodiment of the solid state imaging apparatus according to the invention.

A first embodiment of the invention will now be described. FIG. 3 is a circuit diagram showing a shift register composing the scanning circuit in a first embodiment of the solid-state imaging apparatus according to the invention, where like components as in the shift register shown in FIG. 1 are denoted by like reference numerals.

FIG. 3 includes: 1, a shift register unit having serially connected first clocked inverter 1-1 and second clocked inverter 1-2; 2, a storing switch; 3, a transmitting switch; 4, a storing section formed by serially connecting a first inverter 4-1 and second inverter 4-2. Numeral 6 denotes a unit stage of the shift register.

While a 7-stage shift register is shown in FIG. 3, a construction having many more stages is used in actual solid-state imaging apparatus. One end of the storing switch 2 is connected to an output node of the first clocked inverter 1-1 of the shift register unit at the succeeding stage of its corresponding shift register unit, and the other end thereof is connected to an input of the first inverter 4-1 of the storing section 4. One end of the transmitting switch 3 is connected to an output node of the first clocked inverter 1-1 of its corresponding shift register unit and the other end thereof is connected to an output of the second inverter 4-2 of the storing section 4. The construction of the shift register shown in FIG. 3 is thus different from the construction of the shift register shown in FIG. 1 in the manner of connection of the storing switch 2. Further, for the shift register unit at the last stage, the storing section 4 becomes unnecessary.

The first clocked inverter 1-1 becomes active when a drive clock $\Phi 2$ is at H level, and the second clocked inverter 1-2 becomes active when a drive clock $\Phi 1$ is at H level. A start pulse $\Phi ST$ is inputted to an input of the first-stage shift register unit 1. Further, the storing switch 2 becomes conductive when a memory pulse $\Phi M$ is at H level, and the transmitting switch 3 becomes conductive when a transmitting pulse $\Phi T$ is at H level.

An operation of thus constructed shift register will now be described by way of the timing chart shown in FIG. 4. First in a prescanning (scan location setting period) before a main scanning, H level is inputted to the start pulse $\Phi ST$ at time T1, and it is shifted according to clocks $\Phi 1$, $\Phi 2$ within the shift register. To start the main scanning from the third-stage shift register unit, then, memory pulse $\Phi M$ is driven to H level at time T2 so that the level status at this time of node SR1.5, SR2.5, ... SR6.5 within each shift register unit 1 is stored into the storing section 4. Here, since the storing section 4 is connected to the shift register unit of the succeeding stage through the storing switch 2, the level status of node SR1.5, SR2.5, ... SR6.5 within each shift register unit 1 is stored to the storing section 4 of the shift register units of the first to sixth stages, respectively. Accordingly, the input nodes of the storing section 4 of each stage are to store H, H, L, H, H, H levels, respectively.

Subsequently at time T3-1, by bringing the transmitting pulse $\Phi T$ to H level, the levels H, H, L, H, H, H stored at the respective storing section 4 at time T2 are transmitted to nodes SR0.5, SR1.5, SR2.5, ... SR5.5 within each shift register unit 1. Since the node SR 6.5 at the last stage is not connected to a transmitting switch 3, its status immediately before is kept. Since clock $\Phi 1$ is at H level at this time, inverting outputs of nodes SR0.5, SR1.5, SR2.5, ... SR6.5 are outputted to the nodes SR1.0, SR2.0, SR3.0, ... SR7.0 within each shift register unit 1, respectively. The shift operation is started then according to clocks $\Phi 1$, $\Phi 2$ so as to begin the scanning of the shift register from the node SR3.0 of the third-stage shift register unit.

Further, when memory pulse $\Phi M$ is brought to H level at time T3-2, the level status of node SR1.5, SR2.5, ... SR6.5 within each shift register unit 1 at this time is stored into the storing section 4 similarly to the scan location setting period (prescanning). Accordingly, the input nodes of the storing section 4 are to store H, H, L, H, H, H levels again, respectively, that are the same as the scan location setting period. At time T4-1, the transmitting pulse $\Phi T$ is driven to H level to transmit information at the storing section 4 again to each shift register unit so that the scanning of the shift register is started from SR3.0 similarly to that followed time T3-1. A repetition of the storing of the scan start location is effected again also in this case at time T4-2.

In the main scanning period starting from time T3-1, thus, the scanning of the shift register is to be started from node SR3.0 based on the transmitting of information stored at the storing section 4, and, also in this main scanning, the storing of scan start location can be effected. Accordingly, it becomes possible to periodically effect the storing of a read scan start location information so that a solid-state imaging apparatus can be achieved as that capable of stably reading pixel signals from the same optionally selected region for a long time. It should be noted that the above described drive control of each drive pulse, shift pulse, etc. of the shift register, is effected by a drive control means 13.

While the above description has been given with respect to the method of starting the scanning from the shift register unit at the third stage of the seven stages of shift register units, the read scan start location can be set at will by adjusting the timing for effecting the storing and transmitting operation. Further, while the input of the storing switch has been connected to the shift register unit of the succeeding stage, the connection is not limited to such and it is only required to make a repetition of the storing possible in the main scanning.

While one constructed as capable of starting the scanning from a midpoint of the shift register has been shown, it is obvious that construction for stopping the scanning at a midpoint in the shift register can be achieved by a combination for example using a shift register with a clearing function. Further, while a storing section constructed by two stages of inverters has been shown, its construction is not specifically limited as far as it is capable of retaining the information of the shift register unit. Furthermore, while the shift register unit has been shown as constructed by serially connecting clocked inverters, the present embodiment can be applied also to those shift registers consisting of otherwise constructed shift register units to obtain a similar advantage.

While in the present embodiment the shift register has been shown as provided with a storing section, storing switch, and transmitting switch at each shift register unit, the construction of the shift register can also be such that a storing section, storing switch, and transmitting switch be provided for the shift register units of every several stages. In such a case, the circuit size as a whole of the shift register can be reduced.

Figure 4:
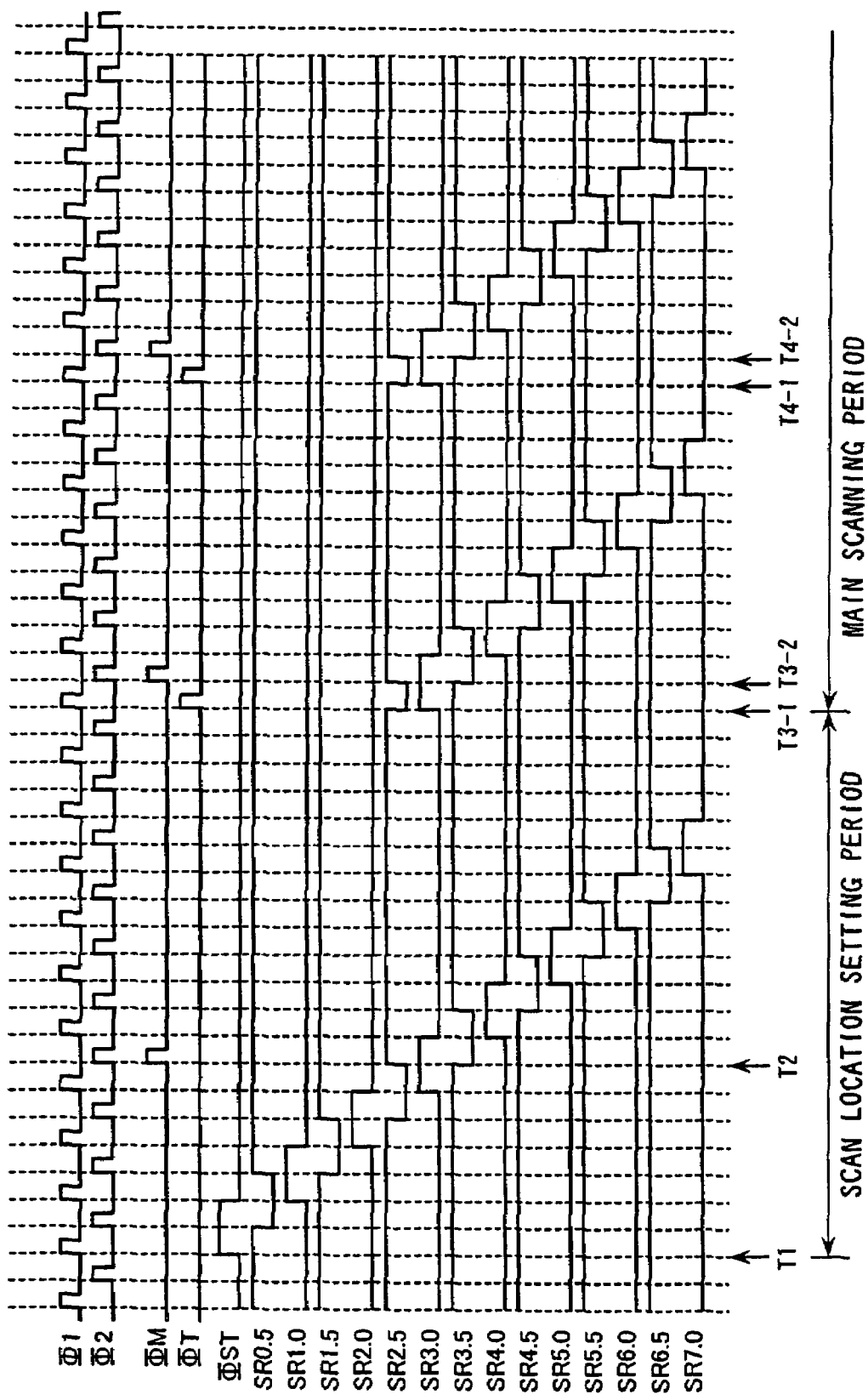
FIG. 4 is a timing chart for explaining operation of the shift register shown in FIG. 3.

As can be seen from FIG. 4, memory pulse ΦM is at H level while an output is being provided from the shift register unit of the first stage of the main scanning. Due to the influence of this clock, therefore, the output of the shift register unit of the first stage alone is different in waveform from the output of the shift register units of other stages, and there is a possibility that the influence reflects on the image. Such influence however can be avoided by adjusting for example the setting of the main scanning start location to a location that precedes the determined stage by one stage, in order not to use the pixel signal scanned by the output of the shift register unit of the first stage as normal signal.

Further, in the present embodiment, the setting of read scan start location before the main scanning is effected such that the shift pulse is sequentially shifted and, at a point in time when it has reached the shift register unit of the stage succeeding the one to be determined as the read scan start location, the pulse information is stored to the storing section. It is however naturally also possible to cause the setting of scan start location before the main scanning to be collectively stored to the storing section at the timing of starting the main scanning by separately providing an exclusive circuit such as a shift register or decoder for setting the scan start location.

Embodiment 2

Figure 5:
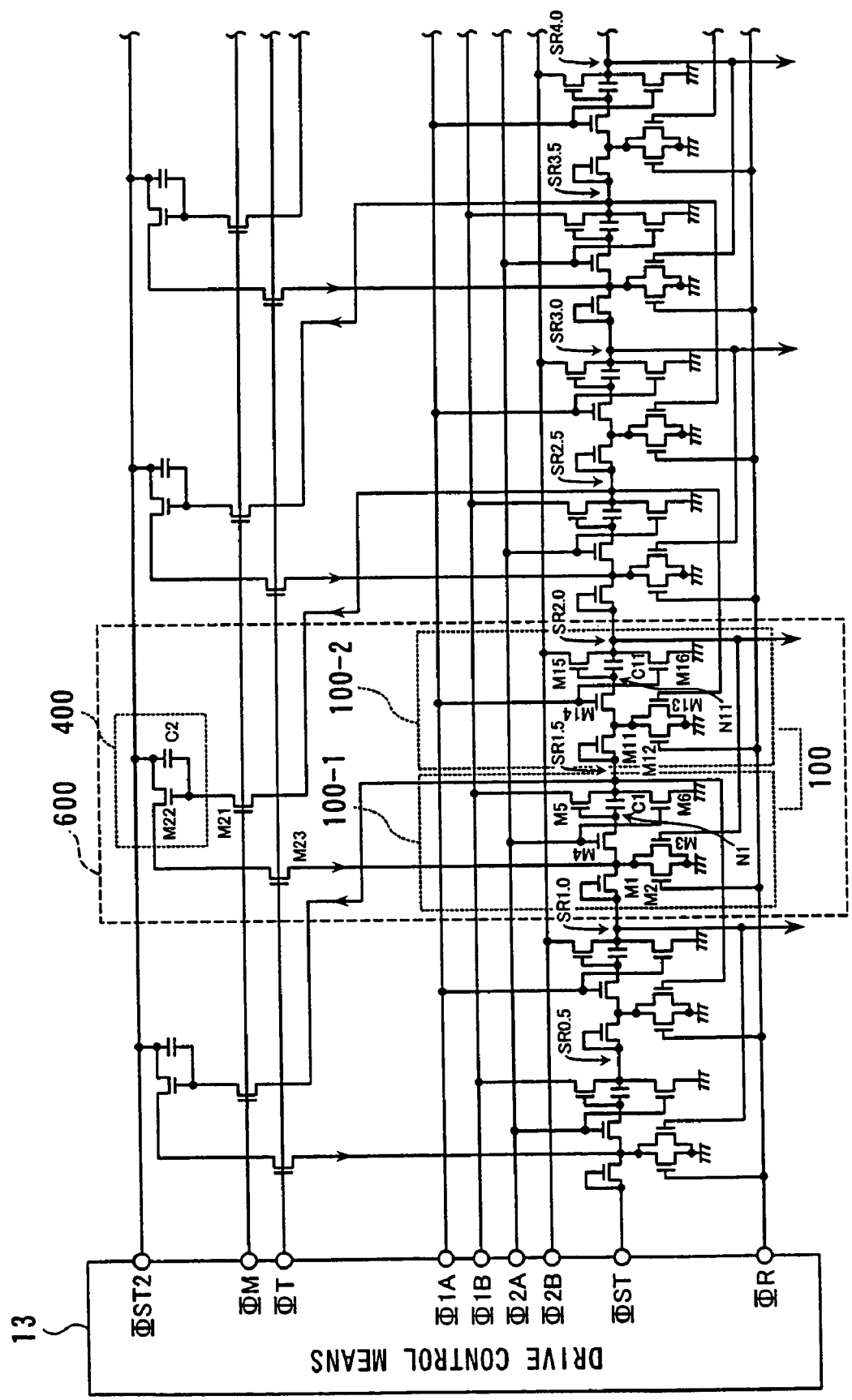
FIG. 5 is a circuit diagram showing a portion of the shift register of the scanning circuit in a second embodiment of the invention.
Figure 6:
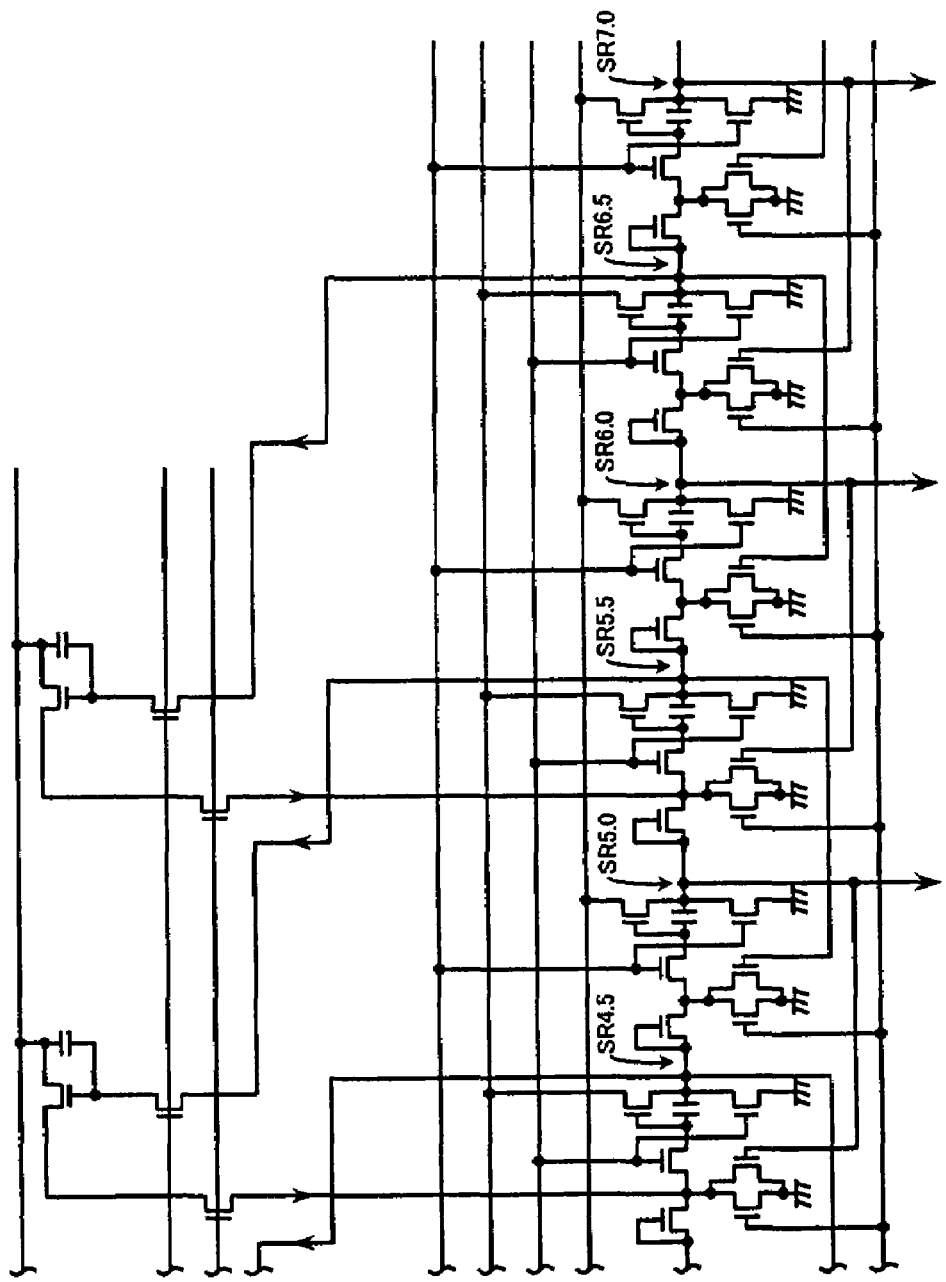
FIG. 6 is circuit diagram showing another portion following the portion of the shift register shown in FIG. 5.

A second embodiment will now be described. FIGS. 5 and 6 each are a circuit diagram showing a shift register constructing the scanning circuit in the second embodiment of the solid-state imaging apparatus according to the invention of the case where it is constructed by nMOS transistors. FIG. 5 shows the portion up to the fourth shift register unit stage of the shift register and FIG. 6 shows the succeeding fifth shift register unit stage and after.

Referring to FIG. 5, numeral 100 denotes a shift register unit formed by serially connecting a first shift register subunit 100-1 and second shift register subunit 100-2. Here it is supposed that the output of the second shift register subunit 100-2 is used as the output signal of the shift register unit 100. While the construction of each shift register unit is the same as another, the components of the shift register unit at the second stage are denoted by reference numerals.

The shift register subunit 100-1 includes: MOS transistor M1 having its gate and drain connected to each other; MOS transistor M4 to be turned ON/OFF by clock Φ 2A, connected at the drain thereof to the source of MOS transistor M1; MOS transistor M2 to be turned ON/OFF by clock ΦR, connected at the drain thereof to a node between MOS transistors M1 and M4 and grounded at the source thereof; MOS transistor M3 to be turned ON/OFF by an output of the succeeding stage, connected in parallel to MOS transistor M2; MOS transistor M5 connected at the gate thereof to the source of MOS transistor M4, to which clock Φ 1B is inputted through the drain thereof; MOS transistor M6 to be turned ON/OFF by clock Φ 2A, connected at the drain thereof to the source of MOS transistor M5 and grounded at the source thereof; and a capacitor C1 provided between the gate and source of MOS transistor M5. Also in the figure, the node connecting the source of MOS transistor M4, the gate of MOS transistor M5 and capacitor C1 is denoted by "N1" for an explanation to be made later.

In thus constructed shift register subunit 100-1, the node N1 and capacitor C1 are charged through the MOS transistors M1 and M4 upon the inputting of the output of the preceding stage when MOS transistor M4 is ON. When clock Φ 1B is inputted to the drain of MOS transistor M5 after the turning OFF of MOS transistor M4, the clock signal inputted to the drain of MOS transistor M5 with keeping its level is caused to occur at the source of MOS transistor M5 due to a bootstrap effect. This becomes an output signal of the shift register subunit 100-1. After outputting the signal from the shift register subunit 100-1, the node N1 is grounded and reset by turning ON MOS transistor M2 or M3 in synchronization with the ON status of MOS transistor M4.

The construction of the shift register subunit 100-2 is substantially the same as the shift register subunit 100-1 and corresponding components thereof are denoted by numerals in the 10s. It is however different in that the gate of MOS transistor M14 is connected to clock Φ 1A and that the drain of MOS transistor M15 is connected to clock Φ 2B.

M21 is the MOS transistor for serving as a storing switch and M23 is the MOS transistor for serving as a transmitting switch. Numeral 400 denotes a storing section including: MOS transistor M22 for receiving clock Φ ST2 at the drain and providing an output from the source thereof; and a capacitor C2 provided in parallel thereto between the gate and drain thereof. The gate of MOS transistor M22 serves as an input of the storing section 400 and the source of MOS transistor M22 serves as an output.

When clock signal Φ ST2 is inputted to the drain of MOS transistor M22 in thus constructed storing section 400, the clock signal Φ ST2 inputted to MOS transistor M22 is outputted with keeping its level through MOS transistor M22 if H-level signal is being stored at capacitor C2. If, on the other hand, L-level signal is being stored at capacitor C2, the clock signal Φ ST2 is not transmitted.

Numeral 600 denotes a unit stage of the shift register. While a 7-stage shift register is shown in FIGS. 5 and 6, many more stages are provided in actual solid-state imaging apparatus. One end of MOS transistor M21 serving as the storing switch is connected to an output node of the first shift register subunit 100-1 of the shift register unit at the succeeding stage, and the other end thereof is connected to the input of the storing section 400. One end of MOS transistor M23 serving as the transmitting switch is connected to a node within the first shift register subunit 100-1 of its corresponding shift register unit and the other end thereof is connected to the output of the storing section 400. It should be noted that the storing section 400 becomes unnecessary for the last stage.

It should be noted that the above described drive control of each drive pulse, shift pulse, etc. of the shift register, is effected by a drive control means 13.

An operation of thus constructed shift register will now be described by way of the timing chart shown in FIG. 7. Here a description will be given with respect the case of scanning from the third-stage shift register unit through fifth-stage shift register unit. First, in prescanning (scan location setting period) before the main scanning, clock Φ 2A, clock Φ 2B, memory pulse Φ M, transmitting pulse Φ T, clock Φ R and subsequently clock Φ 1A, Φ 1B are driven to H level for the period between T1 and T2, so as to reset the nodes within the storing section 400 and shift register unit 100.

An H level is inputted to the start pulse Φ ST at time T2, and it is shifted within the shift register in accordance with clocks Φ 1A, Φ 1B, Φ 2A, Φ 2B. At time T3, memory pulse Φ M is driven to H level to store to the storing section 400 the level status at this time of the nodes SR1.5, SR2.5, ... SR6.5 within each shift register unit 100. Here, since the storing section 400 is connected to the shift register unit of the succeeding stage through MOS transistor M21 which serves as the storing switch, the level status of the nodes SR1.5, SR2.5, ... SR6.5 within each shift register unit 100 is stored to the storing section 400 of the first to sixth shift register unit stages, respectively. Accordingly, the input nodes of the storing section 400 are to store L, L, H, L, L, L levels, respectively.

Since the purpose of the prescanning is to store the start location of the main scanning, clock Φ 1A is driven to L level at time T3 in this case so as not to transmit the shift pulse to the next stage and after. For this reason, clock Φ R is driven to H level at time T4 to terminate the shift operation by resetting the nodes within the shift register unit 100. The preceding period (scan location setting period) is thereby made shorter. Subsequently, by driving the transmitting pulse Φ T and the start pulse Φ ST2 from the storing section 400 to H level at time T5, a start signal is outputted only from the third storing section 400 at which H level is stored, and it is inputted into the shift register unit 100 at the third stage. Thus the scanning of the shift register is started from SR3.0.

Further, when the memory pulse Φ M is driven to H level at time T6, the level status of the nodes SR1.5, SR2.5, ... SR6.5 within each shift register unit 100 at this time is stored to the storing section 400 similarly to the scan location setting period. The input nodes of the storing section 400 thus are to store again L, L, H, L, L, L levels, respectively, that are the same as the scan location setting period. At time T7, clock Φ 2A is driven to L level so as not to transmit the shift pulse to the shift register unit of the succeeding stage. At time T8, then, clock Φ R is driven to H level so that the shift operation is to be terminated upon the outputting of SR5.0 by resetting the nodes within the shift register unit 100. At time T9, the start operation is effected again by driving the transmitting pulse Φ T and start pulse ST2 from the storing section 400 to H level, and the shift operation from SR3.0 through SR5.0 is effected similarly to that after time T5.

Accordingly, in the main scanning period starting from time T5, the scanning of the shift register is started from the node SR3.0 based on the information stored at the storing section 400 and, since the storing of the scan start location is effected also in the main scanning, the storing of the scan start location information can be periodically effected. Thereby, a solid-state imaging apparatus capable of reading pixel signals from the same optionally selected region stably for a long time can be achieved.

In the above, a description has been given of the method for effecting a shift scanning through the shift register units of the third to fifth stages of the 7-stage shift register. The scan (shift) start/stop location however can be set at will by adjusting the timings for effecting the storing, transmitting and resetting operation. Further, while the shift operation in this case is stopped after the termination of the storing operation in the prescanning, it is naturally also possible to cause the shifting to be continued to the last stage.

While the input end of the storing switch has been connected to the shift register unit of the succeeding stage, the connection is not limited to such and it is only required to make a repetition of the storing possible in the main scanning. Further, while the storing section has been shown as constructed by a MOS transistor and capacitor, its construction is not specifically limited as far as it can retain information of the shift register unit. Furthermore, while description has been given on the supposition that the shift register unit is constructed by two subunits and the output of only one of these is used, it is also possible to use the respective outputs of each subunit. Moreover, the construction of the shift register and drive timings for shift operation and shift stop operation are not limited to those shown heretofore.

While in the present embodiment the construction has been shown with providing a storing section, storing switch, and transmitting switch for each shift register unit, it is also possible to provide a storing section, storing switch, and transmitting switch for every several stages of the shift register units. In such a case, the circuit size as a whole of the shift register can be reduced.

Figure 7:
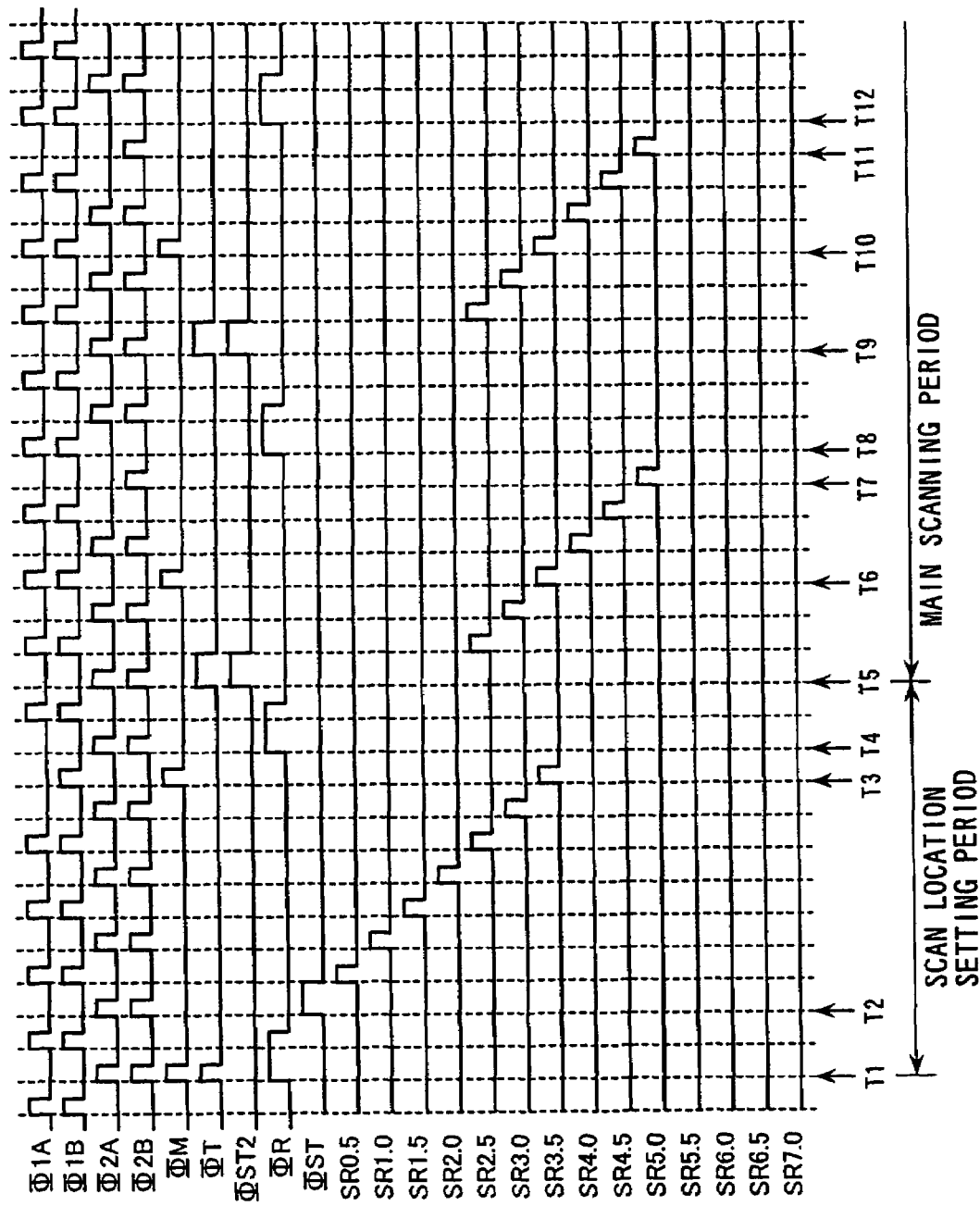
FIG. 7 is a timing chart for explaining operation of the shift register shown in FIGS. 5 and 6.

As can be seen from FIG. 7, since memory pulse Φ M is at H level while an output is being provided from the shift register unit of the first stage of the main scanning, the output of the shift register unit of the first stage alone is different in waveform from the output of the shift register units of other stages as influenced by this clock and the influence may reflect on the image. Such influence however can be avoided by adjusting for example the setting of the main scanning start location to a location that precedes the determined stage by one stage, in order not to use the pixel signal scanned by the shift register unit output of the first stage as normal signal.

Further, in the present embodiment, the setting of read scan start location before the main scanning is effected such that a shift pulse is sequentially shifted and, at a point in time when it has reached the shift register unit of the stage succeeding the one to be determined as the read scan start location, the pulse information is stored to the storing section. It is however naturally also possible to cause the setting of scan start location before the main scanning to be collectively stored to the storing section at the timing of starting the main scanning by separately providing an exclusive circuit such as a shift register or decoder to set the scan start location.

Embodiment 3

Figure 8:
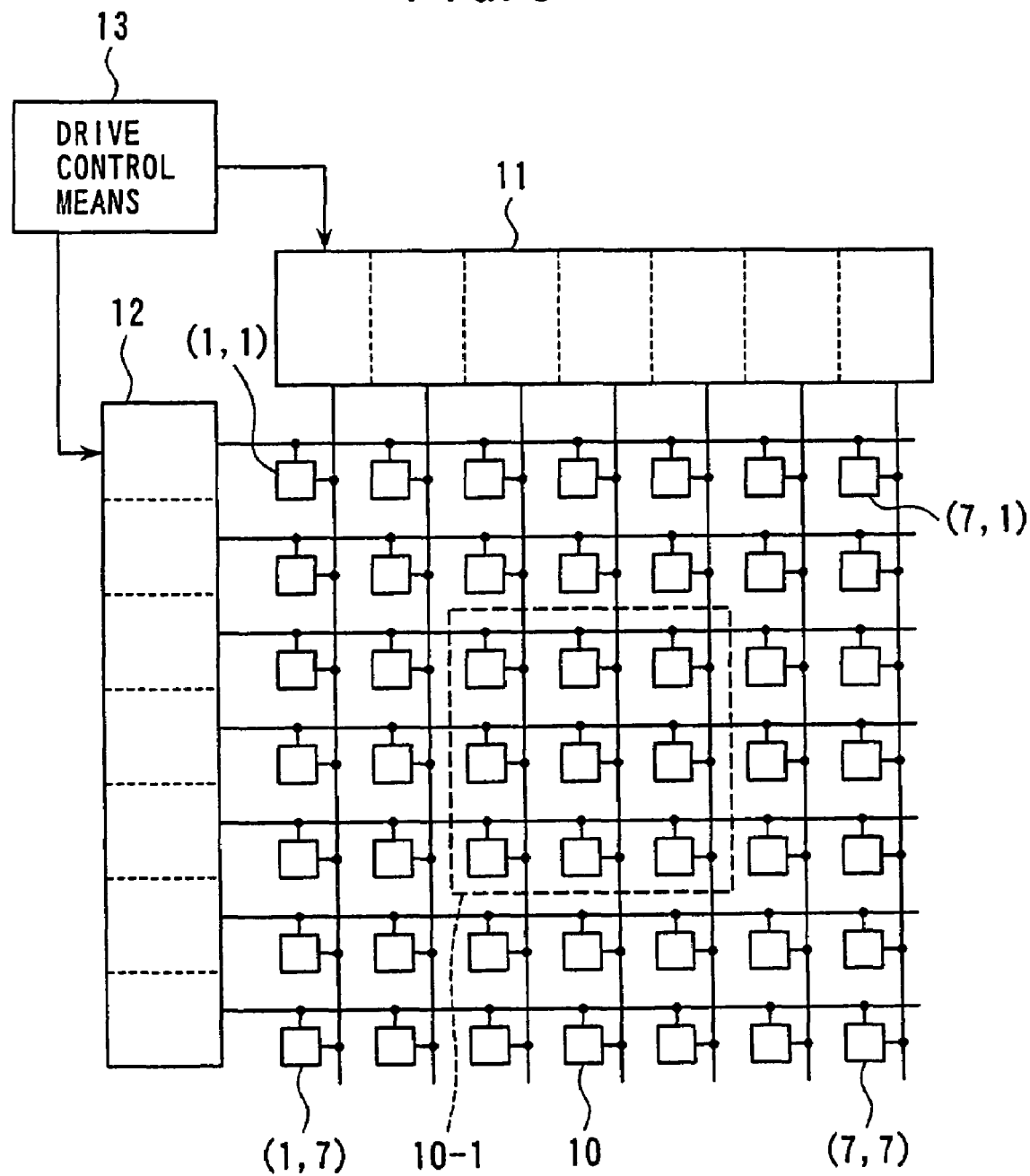
FIG. 8 is a schematic block diagram showing a third embodiment of the invention.

A specific example of solid-state imaging apparatus using the shift register described in the first or second embodiment in its horizontal and vertical scanning circuits will now be described by way of FIG. 8 as a third embodiment. Referring to FIG. 8, numeral 10 denotes pixels arranged in a 7×7 array and 10-1 denotes pixels (3×3 pixels) to be read out. In FIG. 8, "i" of pixel (i,j) indicates 1, 2, ... 7 from the left side, and "j" indicates 1, 2, ... 7 from the upper side. Numerals 11 and 12 denote a horizontal and vertical scanning circuits, respectively, formed of the shift register shown in the first or second embodiment. The pixels of the row selected by the vertical scanning circuit 12 are sequentially selected by the horizontal scanning circuit 11 so as to read signal from the pixels selected by the two scanning circuits. Here the operation of the horizontal scanning circuit 11 and vertical scanning circuit 12 is controlled by a drive control means 13.

Of the 7×7 pixels, in this case, the 3×3 pixels 10-1 at a center portion are set as an optionally selected pixel range so as to read signal from these pixels by scanning this range. By driving the shift registers of the horizontal and vertical scanning circuits 11, 12 by the method shown in the first or second embodiment, selection signals are outputted from the shift register units of the third, fourth and fifth stages of the 7-stage shift register. Accordingly, of the 7×7 pixels, signals are read from 3×3 pixels corresponding to the portion of slant lines in FIG. 9.

By the above construction, a solid-state imaging apparatus capable of reading signals from the pixels in an optionally selected range of the entire pixel region can be achieved. While an example of obtaining the signals of 3×3 pixels among 7×7 pixels has been shown in the present embodiment, the total number of pixels and the number of pixels to be read may be set at will.

While one using the shift register according to the invention in both the horizontal and vertical scanning circuits has been shown in the above described construction, it is also possible to use it in one or the other of the two scanning circuits so as to read an optionally selected range only in the horizontal or vertical direction.

As has been described by way of the above embodiments, with the solid-state imaging apparatus according to the first aspect of the invention, an accurate stored information can be transmitted to the shift register unit by effecting the storing of a read scan start location information also in the main scanning so that a solid-state imaging apparatus can be achieved as capable of reading pixel signals from the same optionally selected region stably for a long time. Further, with the solid-state imaging apparatus according to the second aspect of the invention, there is an advantage that it is not necessary to provide a special circuit to store an information related to the read scan start location.

What is claimed is:

1. An XY-addressing solid-state imaging apparatus comprising a solid-state imaging device having a plurality of two-dimensionally arranged pixels and horizontal and vertical scanning circuits for reading pixel signals of the solid-state imaging device; a shift register constructing at least one of said horizontal and vertical scanning circuits comprising:

shift register units serially connected in a large number of stages for transferring information related to read scan location by clock, a storing section disposed corresponding to each shift register unit for storing an output of shift register unit at a succeeding stage of the shift register unit, a storing switch provided between the shift register unit at said succeeding stage and an input of said storing section, and a transmitting switch provided between an output of said storing section and corresponding shift register unit; said solid-state imaging apparatus comprising:

a drive control means for causing said storing section to store information related to a read scan start location in a scan start location setting period before a main scanning and, in the main scanning, transmitting to the shift register the information related to said read scan start location stored at said storing section previously to the main scanning by driving said transmitting switch to transfer the information related to the read scan start location and for storing again the information related to said read scan start location by driving said storing switch at a timing of the arriving of the information related to said read scan start location at the shift register unit connected through said storing switch to said storing section at which the information related to said read scan start location is stored.

2. The XY-addressing solid-state imaging apparatus according to claim 1, wherein said drive control means, after shifting a shift pulse for inputting to the shift register the information related to said read scan start location to a shift register unit at the succeeding stage of the shift register unit at a desired read scan start location in the scan start location setting period before the main scanning, drives said storing switch to cause information of each shift register unit to be stored to said storing section connected thereto through said storing switch so as to store the information related to the read scan start location.

* * * * *